United States Patent [19]
Subler et al.

[11] Patent Number: 6,098,263
[45] Date of Patent: Aug. 8, 2000

[54] APPARATUS AND METHOD FOR BLOCKING SHAFT OF LARGE SCALE ROTATABLE ASSEMBLY

[75] Inventors: William L. Subler, Kings Mountain; Harvey A. Trickel, Gastonia, both of N.C.

[73] Assignee: Reliance Electric Technologies, LLC, Thousand Oaks, Calif.

[21] Appl. No.: 08/958,174

[22] Filed: Oct. 27, 1997

[51] Int. Cl.⁷ ..................................................... B23P 11/02
[52] U.S. Cl. ...................... 29/446; 29/525.11; 29/525.02; 384/448; 403/229
[58] Field of Search .................................. 29/446, 525.11, 29/450, 525.01, 525.02; 403/229, 225, 220; 384/448; 53/472

[56] References Cited

U.S. PATENT DOCUMENTS

| | | | |
|---|---|---|---|
| 4,173,376 | 11/1979 | Standing et al. | 384/517 |
| 4,961,654 | 10/1990 | Pangburn et al. | 384/517 |
| 5,030,016 | 7/1991 | Shoeffter | 384/448 |

*Primary Examiner*—David P. Bryant
*Assistant Examiner*—Jermie E. Cozart
*Attorney, Agent, or Firm*—Craig N. Killen; John J. Horn; William R. Walbrun

[57] ABSTRACT

The rotatable shaft of a large machine is blocked using a plurality of preloaded springs held by a collar member secured to the housing of the machine so as to prevent the roller bearing supporting the non-drive end of the shaft from being damaged during shipment of the machine.

9 Claims, 9 Drawing Sheets

APPARATUS AND METHOD FOR BLOCKING SHAFT OF LARGE SCALE ROTATABLE ASSEMBLY

BACKGROUND OF THE INVENTION

The present invention relates generally to apparatus and methods for blocking the rotatable shaft of the rotatable assembly of machinery during shipment thereof. More particularly, the invention relates to such apparatus and methods for large rotatable assemblies supported by a roller bearing.

Manufacturers of large machinery often must ship this machinery long distances by land or sea. The rotatable assemblies of such machinery must be locked in place during shipment to prevent damage to the bearings during shipment. The conventional practice of blocking movements of the rotatable assemblies calls for placing a brace across the drive end of the rotatable shaft. While such bracing is effective to lock the shaft in the axial direction and the circumferential direction, this blocking method appears to work satisfactorily only when the bearings for the shaft consist of a single roller bearing supporting the drive end of the shaft and a ball bearing supporting the opposite end, i.e., the non-drive end, of the shaft.

However, when the bearings for the rotatable assembly consist of a ball bearing and a roller bearing at the non-drive end of the shaft, conventional bracing of the shaft assembly fails to prevent the tendency of the rotatable assembly to vibrate through the roller bearing components, and this can result in damage to the roller bearing. The ball bearing on this end is locked in the axial direction by the conventional brace. But simply controlling axial movement cannot prevent the roller bearing from movements in the radial direction. Moreover, rigidly blocking the shaft in the radial direction can cause bearing damage.

Another conventional method for blocking the shaft, relies on a cone that is bolted so as to lift the shaft from the bearings to remove all load from the bearings. However, this method cannot prevent the small motions of the rollers that causes false-brinelling, which damages the roller bearing.

SUMMARY OF THE INVENTION

The present invention recognizes and addresses the foregoing disadvantages, and others, of prior art constructions and methods. Accordingly, it is an object of the present invention to provide an improved apparatus and method for blocking the rotatable shaft of the rotatable assembly of large machinery during shipment thereof.

It is a further object of the present invention to provide an improved apparatus and method for blocking the rotatable shaft of the rotatable assembly of large machinery during shipment thereof, wherein the amount of force being applied to the shaft is controlled in both the radial and circumferential directions.

It also is an object of the present invention to provide an improved apparatus and method for blocking the rotatable shaft of the rotatable assembly of large machinery during shipment thereof, in particular when the bearings for the rotatable assembly consist of a roller bearing and a ball bearing at the non-drive end that is designed to take zero radial load.

It is another object of the present invention to provide an improved apparatus and method for blocking the rotatable shaft of the rotatable assembly of large machinery during shipment thereof, wherein the amount of force being applied to the shaft by the assemblers cannot exceed preset limits that would lead to damage of the bearing.

It is yet a further object of the present invention to provide an improved apparatus and method for blocking the rotatable shaft of the rotatable assembly of large machinery during shipment thereof, wherein all of the above objects are achieved on both single and double shaft extension equipment.

These and other objects are achieved by a blocking apparatus that includes a spring holder assembly. For single shaft extension equipment, a shaft cap is provided. The non-drive end of the shaft of the rotatable assembly of the large scale machine, i.e., the end that is opposite the drive end, is identified. The shaft cap has a cylindrical, outer circumferential surface that is disposed at a constant radial distance from the axis of rotation of the shaft cap. The inner end surface of the shaft cap, which is the end that faces the shaft, is provided with a concentric registering device in the form of a pilot member that is concentrically disposed with respect to the outer surface of the shaft cap. The pilot member of the inner end surface of the shaft cap is disposed into a counterbore that is concentrically formed in the non-drive end of the rotatable shaft of the large machine so that the axis of rotation of the shaft cap is disposed to coincide with the rotatable axis of the rotatable assembly of the large machine. The border region of the inner end of the shaft cap is disposed against the non-drive end of the rotatable shaft. Axially extending bolts are then used to attach the shaft cap to the non-drive end of the shaft of the rotatable assembly.

The spring holder assembly is provided in the form of a collar member that has an inner circumferential surface. For single shaft extension equipment, the operator disposes this inner circumferential surface in a concentric fashion with respect to the outer circumferential surface of the shaft cap and oriented so that a substantial portion is disposed vertically above the shaft cap. For double shaft extension equipment, the operator disposes this inner circumferential surface in a concentric fashion with respect to the outer circumferential surface of the extended shaft and oriented so that a substantial portion is disposed vertically above the shaft. Then the operator uses bolts to attach the spring holder assembly to the exterior housing of the machinery at the non-drive end of the large machine. A plurality of radial openings are defined to extend in a generally radial direction through the collar member. Each radial opening is counterbored so as to be pre-machined with a shoulder that is disposed at a predetermined radial distance from the axis of symmetry that coincides with the rotatable axis of the rotatable assembly of the large machine.

A spring of a pre-determined length and force constant is inserted into each of the radial openings of the collar member. A setting plug is then inserted on top of the back end of each spring. The operator then secures the setting plug so that it rests in position against the shoulder in the radial opening. The setting plug can take several forms, and one such is a flat disk member. One of several ways to secure the setting plug is for the operator to insert a threaded setting bolt into a threaded counter-bore portion of each radial opening and tighten the threaded bolt against the spacer until the spacer is secured to rest in position against the shoulder in the radial opening. In the single shaft embodiment, the front end of the spring will then engage the shaft cap's outer circumferential surface and apply a predetermined force thereto. In the double shaft embodiment, the front end of the spring will then engage the shaft's outer circumferential surface and apply a predetermined force thereto. In both embodiments, this force is transmitted through the shaft to pre-load the roller bearing that supports the non-drive end of the shaft.

Other objects and aspects of the present invention are provided by various combinations and sub-combinations of the disclosed elements, which are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings, in which.

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary constructions. The same numerals are used throughout the specification and drawings to reference the same features or corresponding features that are common to different embodiments. Moreover, features that are part of one embodiment can be combined with features of another embodiment to yield a yet further embodiment.

Figure 1:
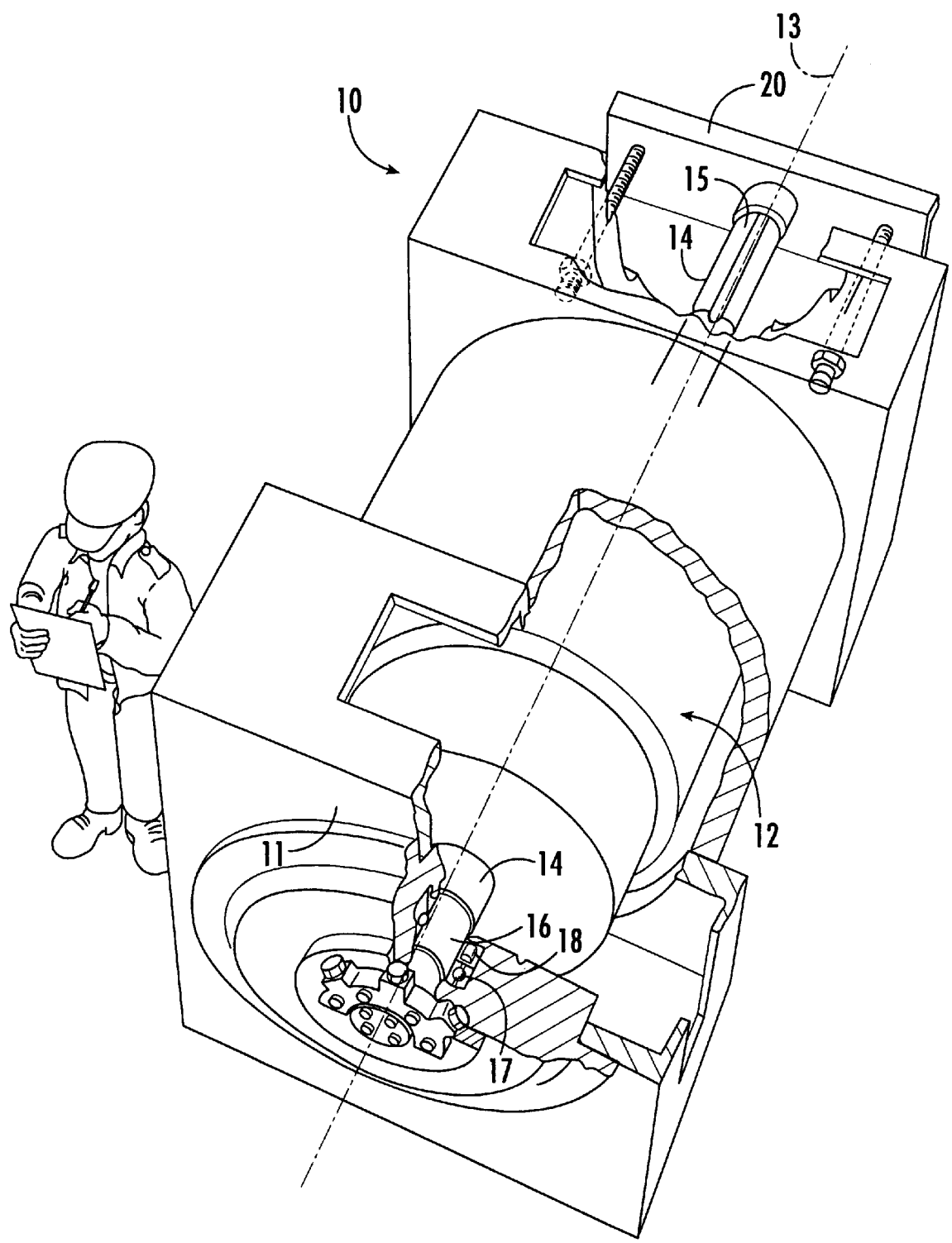
FIG. 1 is an elevated perspective view of a large electric motor with a single shaft extension readied for shipment with its rotor shaft blocked in accordance with a presently preferred embodiment of the apparatus of the invention.

The present invention pertains to an apparatus and method for blocking the large scale, rotatable, cylindrical shaft of the rotatable assembly of a large machine such as indicated generally in FIG. 1 by the designating numeral 10. In the view shown, the machine's housing 11 has been partially cut away to reveal the rotatable assembly, which is indicated generally by the designating numeral 12 and has an axis of rotation indicated by the dashed line designated 13. Rotatable assembly 12 has a rotatable cylindrical shaft 14 forming part of same and having a drive end 15 and a non-drive end 16 disposed opposite drive end 15. Non-drive end 16 of shaft 14 is rotatably supported by a ball bearing 17 and an axially adjacent roller bearing 18, which is shown in greater detail in FIGS. 2 and 6 for example. In the enlarged view of the non-drive end of the machine shown in FIG. 7, there is a double shaft extension portion 14A of shaft 14 at the non-drive end 16, and thus non-drive end 16 of shaft 14 extends about a foot beyond housing 11.

Figure 2:
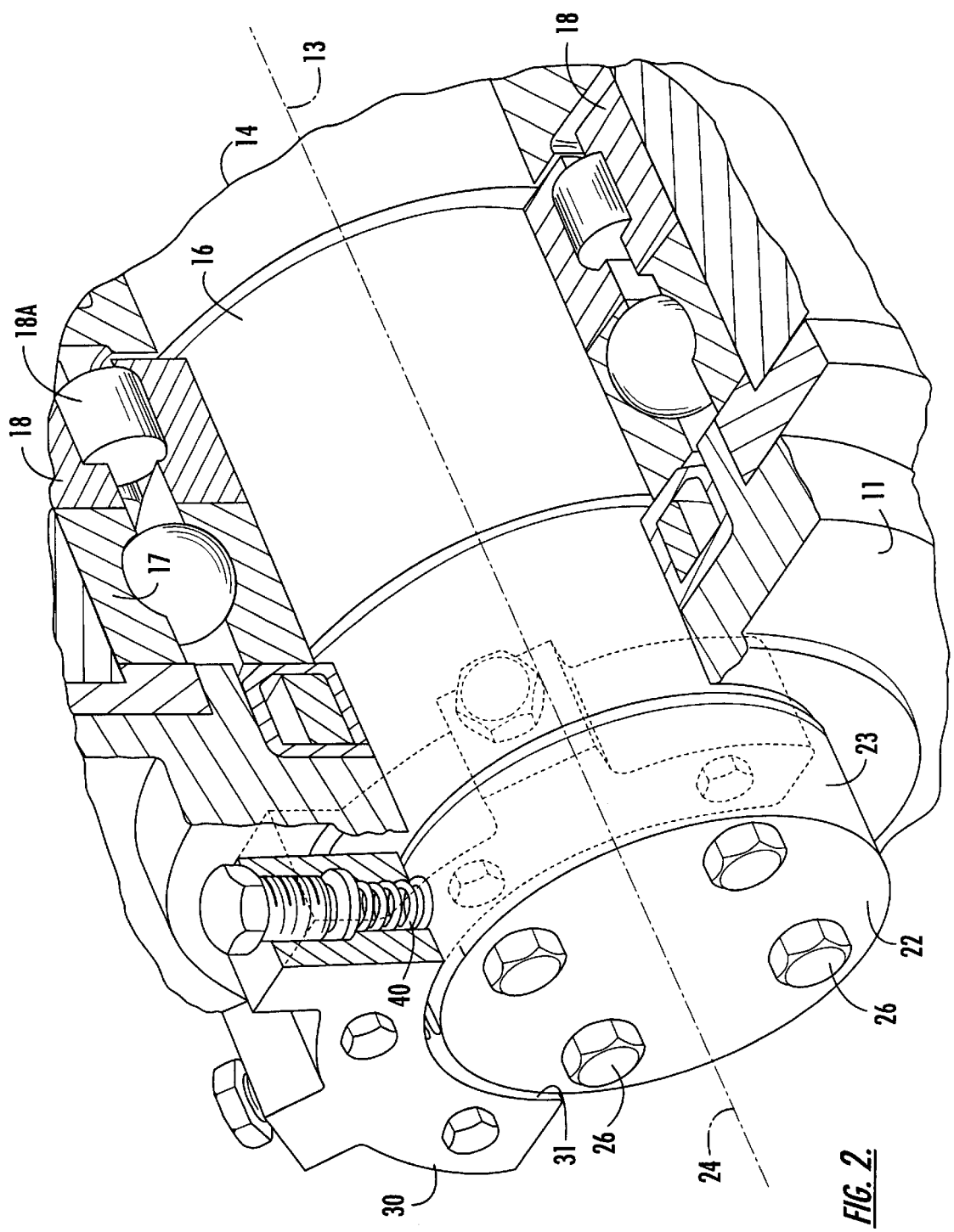
FIG. 2 is an elevated perspective view of a presently preferred single shaft extension embodiment of the shaft blocking apparatus of the invention installed on a machine, the view depicting portions cut away, portions shown in phantom, and portions shown in cross-section.

In the embodiment shown in FIG. 1, the machine is a large scale electric motor, and the rotatable assembly is a rotor of the motor. However, other large machines with large rotatable assemblies such as generators for example, also would be candidates for the present invention. In such large scale machines, the rotatable assembly weighs many thousands of pounds. In the electric motor shown, the rotatable assembly would weigh on the order of fifteen thousand pounds to twenty five thousand pounds, depending on the axial length of the rotor. The diameter of shaft 14 in such a machine would be on the order of eight and one-half (8.5) inches or 21.59 cm at the non-drive end 16. Referring to FIG. 2, a typical roller 18A of roller bearing 18 would weigh about 1.5 pounds and have a diameter of about 1.5 inches.

As shown in FIG. 1, a conventional brace, which is indicated generally by the designating numeral 20, is fixed to drive end 15 of shaft 14. As such braces 20 are well known, the details need not be explained in further detail. Brace 20 is fixed to housing 11 in a manner that permits brace 20 to prevent axial movement of shaft 14 relative to housing 11. In addition, as is conventional, brace 20 is fixed to drive end 15 of shaft 14 so as to prevent rotation of shaft 14. However, while brace 20 thus blocks shaft 14 against rotation and axial movement, brace 20 does not prevent shaft 14 from radial movement. Such radial movements of shaft 14 might occur during shipment of machine 10 as the machine is bounced up and down and jostled from side-to-side. Moreover, such radial movements can damage roller bearing 18 and ball bearing 17, and the prevention of such damage is a focus of the present invention.

Figure 3:
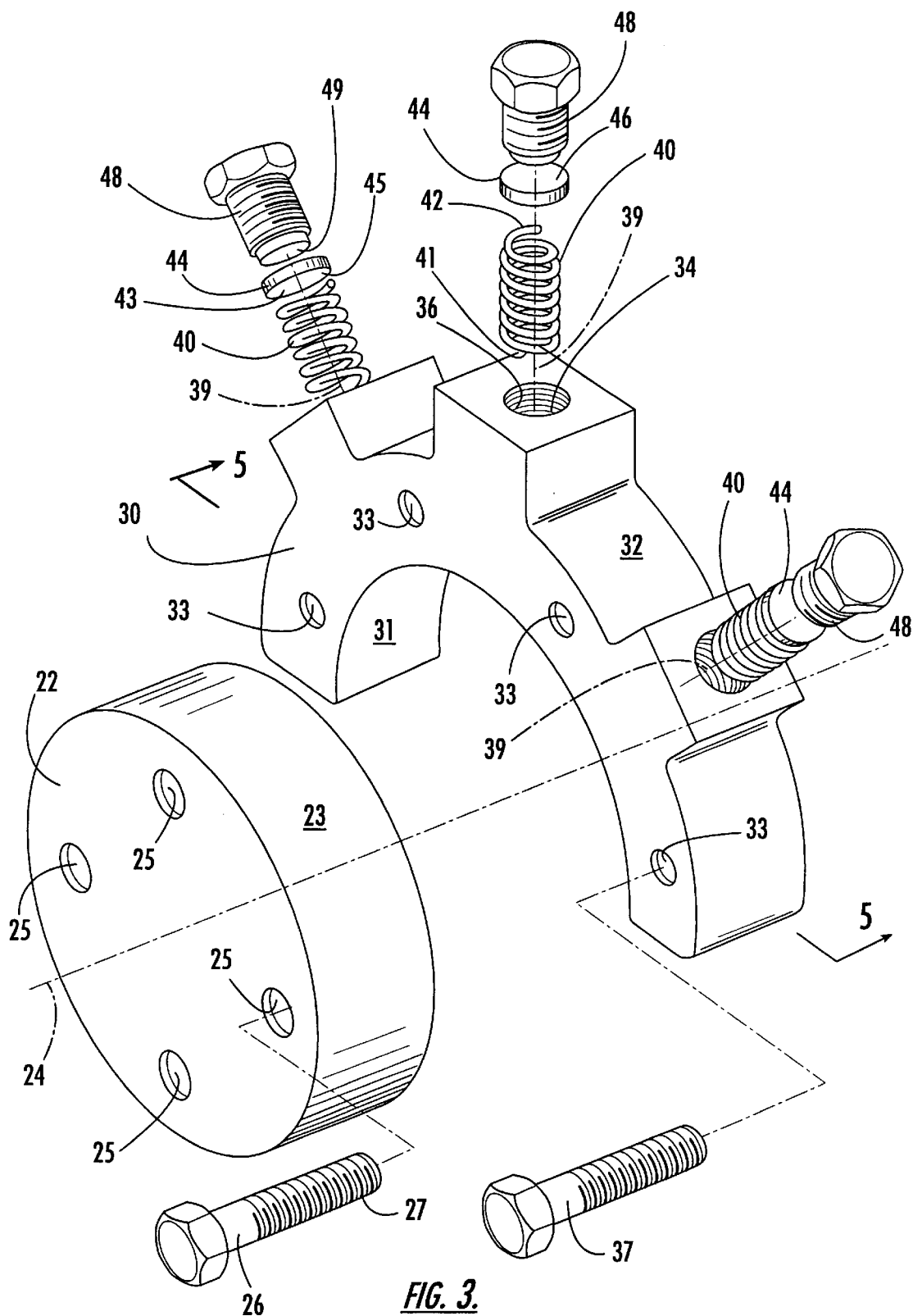
FIG. 3 is an elevated, perspective, assembly view of a presently preferred single shaft extension embodiment of the shaft blocking apparatus of the invention.
Figure 4:
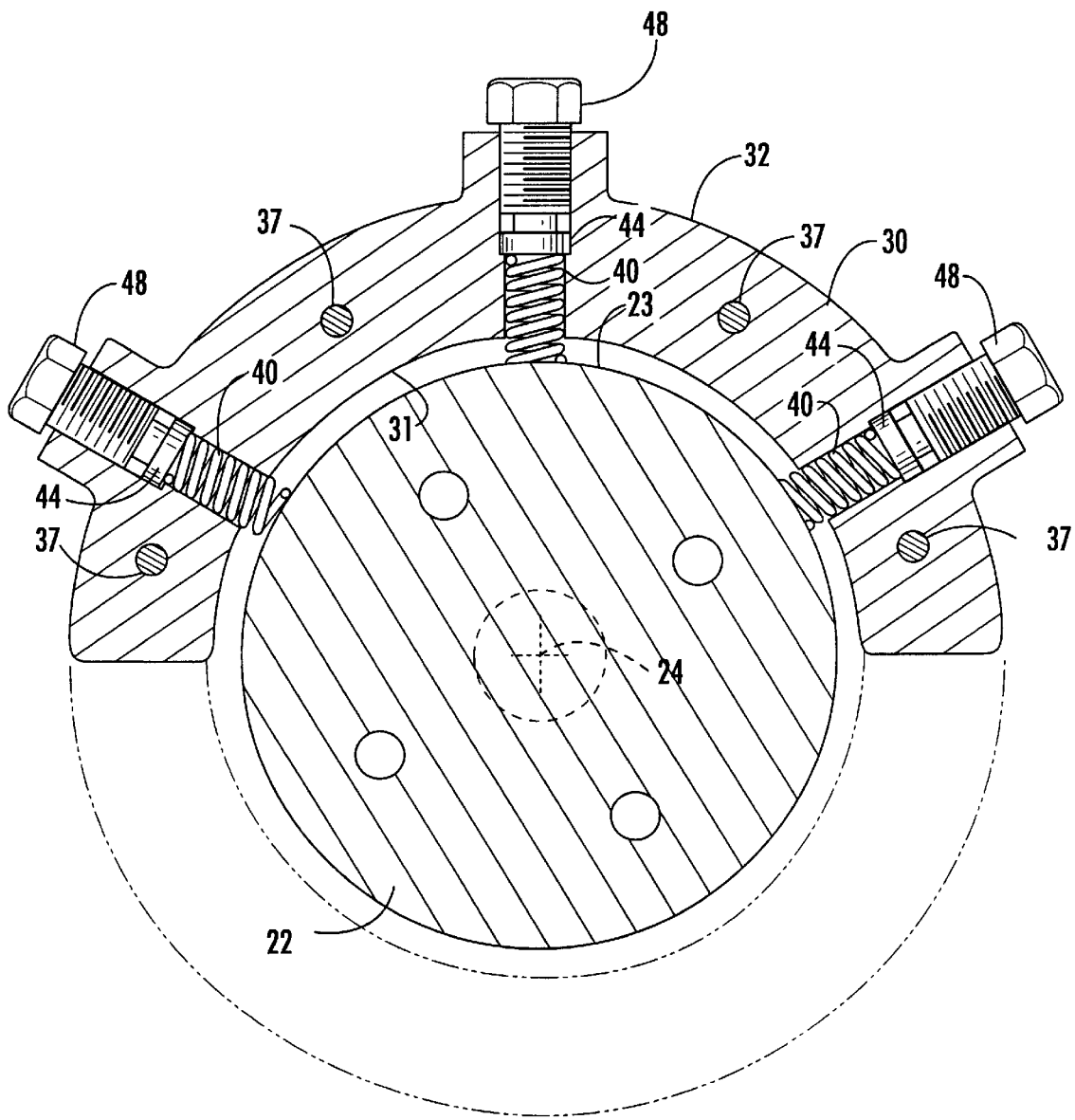
FIG. 4 is a cross-sectional view taken along a line of sight that looks in the axial direction of the rotor shaft in FIG. 1.
Figure 6:
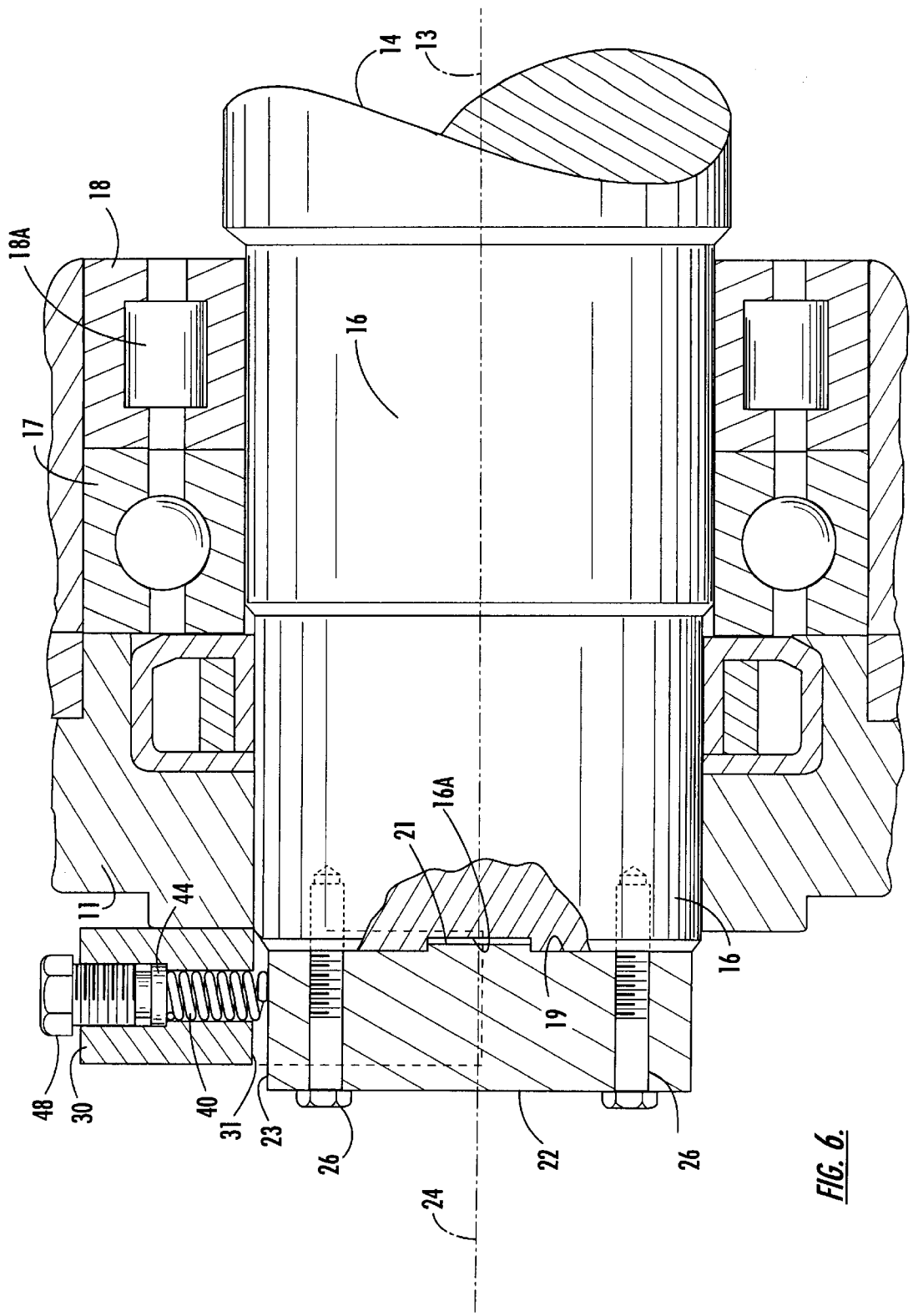
FIG. 6 is a cross-sectional view of a presently preferred single shaft extension embodiment of the shaft blocking apparatus of the invention with portions shown in phantom and installed on a large electrical machine with a rotor shaft.

In accordance with the embodiments of the present invention intended for single shaft extension equipment, a shaft cap is provided. As shown in FIGS. 2–4 and 6 for example, a shaft cap 22 is configured in the form of a flat, circular plate formed of steel or material of like strength and durability. As shown in FIGS. 2–4 for and 6 example, shaft cap 22 has a curved outer circumferential surface 23 having a constant radius of curvature. Thus, as shown in FIG. 3, shaft cap 22, and in particular outer surface 23 thereof, defines an axis of rotational symmetry 24, which is formed at the intersection of the dashed-line cross shown in FIG. 4. As shown in FIG. 6, the diameter of shaft cap is slightly smaller than the diameter of the non-drive end 16 of shaft 14. As shown in FIG. 2 for example, outer surface 23 of shaft cap 22 is configured concentrically relative to the axis of rotation 13 of shaft 22 of machine 10 to be blocked. For a shaft of nominal 8.5 inches in diameter, shaft cap 22 would have a diameter of on the order of 8.3 inches and have an axial thickness of about three (3) inches.

Figure 8:
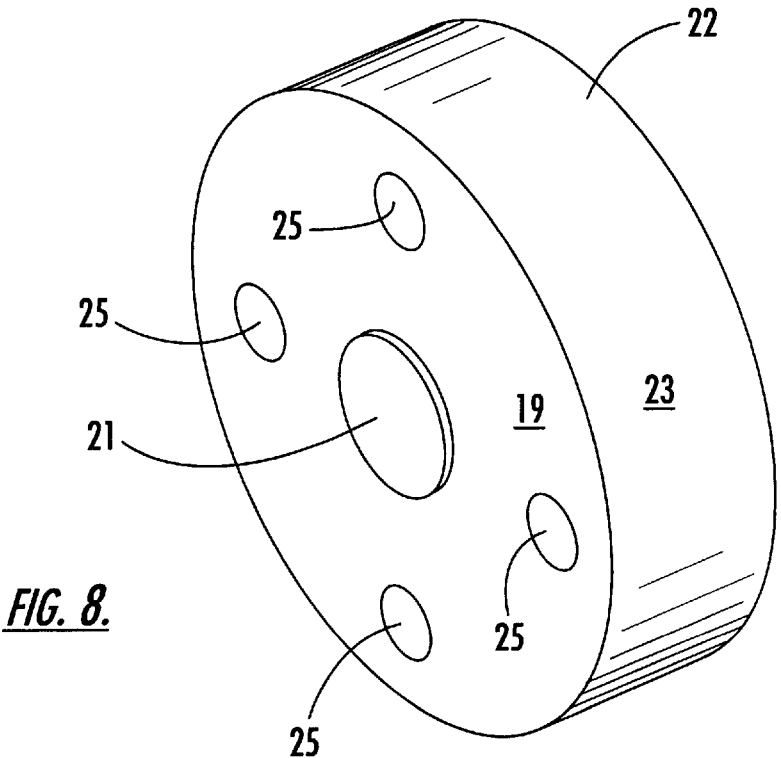
FIG. 8 is an elevated, perspective, view of a presently preferred embodiment of the shaft cap component of the blocking apparatus of the invention intended for single shaft extension equipment.

As shown in FIG. 6, shaft cap 22 has an inner end surface, which is the end that faces non-drive end 16 of shaft 14. As shown in FIG. 8, this inner end surface of shaft cap 22 is provided with a concentric registering device in the form of a pilot member 21 that is concentrically disposed with respect to the outer surface 23 of shaft cap 22. Pilot member 21 extends a short distance axially away from the surrounding border portion 19 of the inner end surface of shaft cap 22. As shown in FIG. 6 for example, pilot member 21 is configured to be disposed into a counterbore 16A that is concentrically formed in the free edge of non-drive end 16 of the rotatable shaft 14 of the large machine so that the axis of rotation 24 of shaft cap 22 is disposed to coincide with the rotatable axis 13 of shaft 14 of the large machine. Moreover, in order to ensure precise registry with counterbore 16A, the dimensional machine tolerance for the diameter of pilot member 21 would typically be on the order of 2 to 4 thousandths of an inch.

The axial depth of counterbore 16A is less than the axial thickness of pilot member 21 such that border region 19 of shaft cap 22 is disposed against the non-drive end of the rotatable shaft. For example, a typical axial thickness of pilot member 22 would be about one eighth inch, and the axial depth of counterbore 16A would be about three sixteenths of an inch.

As shown in FIG. 3, shaft cap 22 is provided with a plurality of symmetrically arranged attachment holes 25 that extend axially through the thickness of shaft cap 22. As used herein, a plurality means two or more. Each such attachment hole 25 is configured for receiving one of a plurality of attachment bolts 26 having threaded end portions 27. As shown in FIG. 6, once pilot member 21 is inserted into counterbore 16A, shaft cap 22 is thereby configured to be secured to non-drive end of shaft by bolts 26 threadingly received in axially extending, threaded holes formed in non-drive end 16 of shaft 14. Moreover, as shown in FIG. 6, by virtue of pilot member 21, shaft cap 22 is secured to non-drive end 16 of shaft 14 with the axis of rotational symmetry 24 of shaft cap 22 disposed coincidentally with axis of rotation 13 of shaft 14. Typically, the location of each attachment hole 25 would be held to a machine tolerance of about 30 thousandths of an inch.

In further accordance with the present invention, a collar member is provided and configured to be secured to the housing of the shaft and hold a plurality of spring members so as to apply a predetermined force against the outer circumferential surface of either the machine's shaft (in double shaft extension equipment) or the shaft cap (in single shaft extension equipment) and thereby apply a predetermined radial load to the roller bearing that rotatably supports the non-drive end of the shaft.

As shown in FIGS. 3–6 for example, a collar member is designated generally by the numeral 30. As shown in FIG. 4, collar member 30 has an inner surface 31 configured to surround at least a portion of outer circumferential surface 23 of shaft cap 22 (in single shaft extension equipment) or the outer circumferential surface 28 (FIG. 7) of non-drive end 16 of shaft 14 (in double shaft extension equipment). As shown in FIGS. 3 and 4 for example, inner surface 31 of collar member 30 is curved in a configuration that is complementary to outer surface 23 of shaft cap 22 so that the generally concave inner surface 31 matches up with the generally convex outer surface 23. A similar relationship pertains to outer surface 28 of non-drive end 16 of shaft 14 in the embodiment for double extension equipment shown in FIG. 3. For a shaft cap 22 with the diameter of outer surface 23 at about 8.3 inches, the diameter of inner surface 31 of collar member 30 would be on the order of 8.369 inches. Collar member 30 further defines an outer surface 32 generally disposed opposite to inner surface 31.

Figure 5:
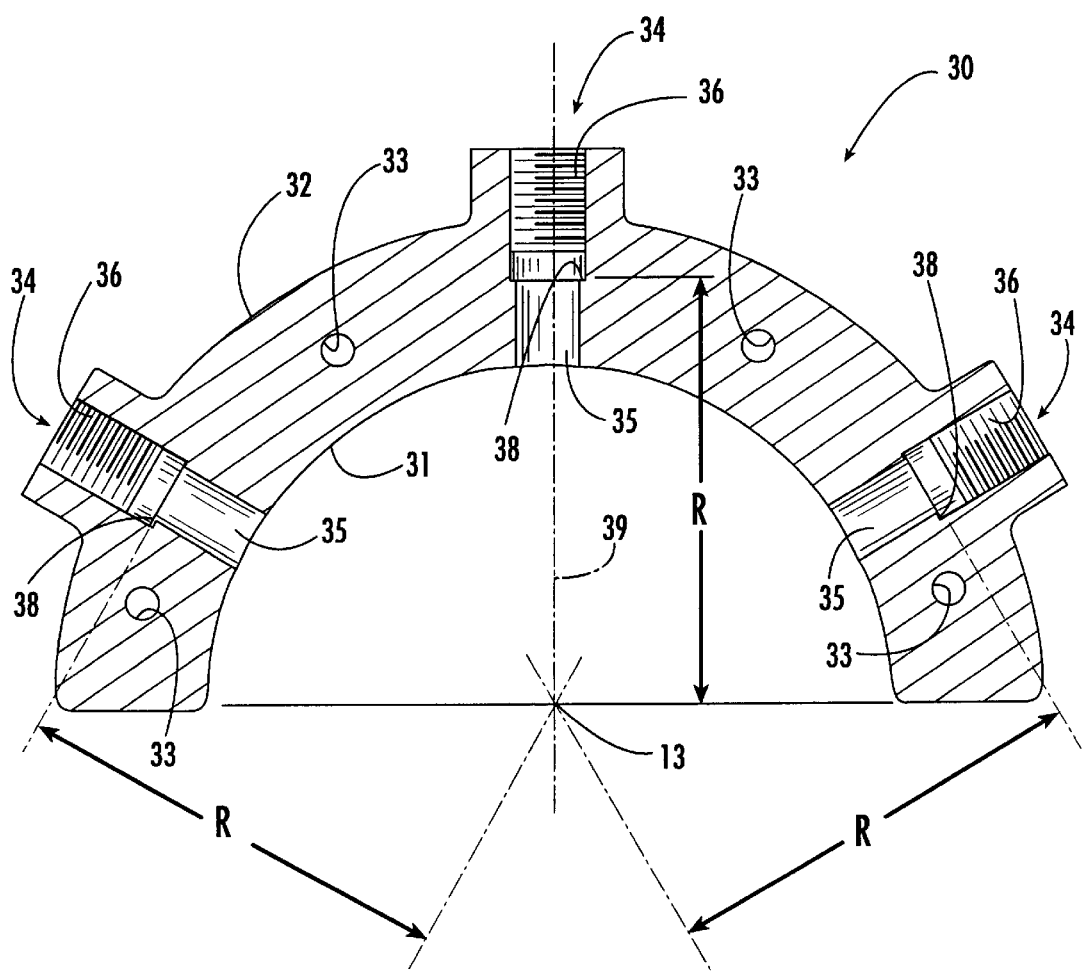
FIG. 5 is a cross-sectional view similar to that shown in FIG. 4 and with arrows indicating identical linear dimensions to be held in locating the shoulders of the apparatus of the present invention.

As shown in FIGS. 3 and 5, collar member 30 is configured to function as a spring holder and defines a plurality of radial openings 34 therefor. Each radial opening 34 is configured and disposed to extend in a radial direction through collar member 30. As shown in FIG. 5 for example, each radial opening 34 defines a lower portion 35 extending through inner surface 31 and having a first diameter. Moreover, each radial opening 34 defines an upper portion 36 extending through outer surface 32 of collar member 30 and having a second diameter, which is larger than the first diameter of lower portion 35. In the embodiment shown in FIGS. 4 and 5, upper portion 36 is threaded to receive a setting plug in the form of a threaded setting bolt 48 that seats against a disk member 44.

Figure 9:
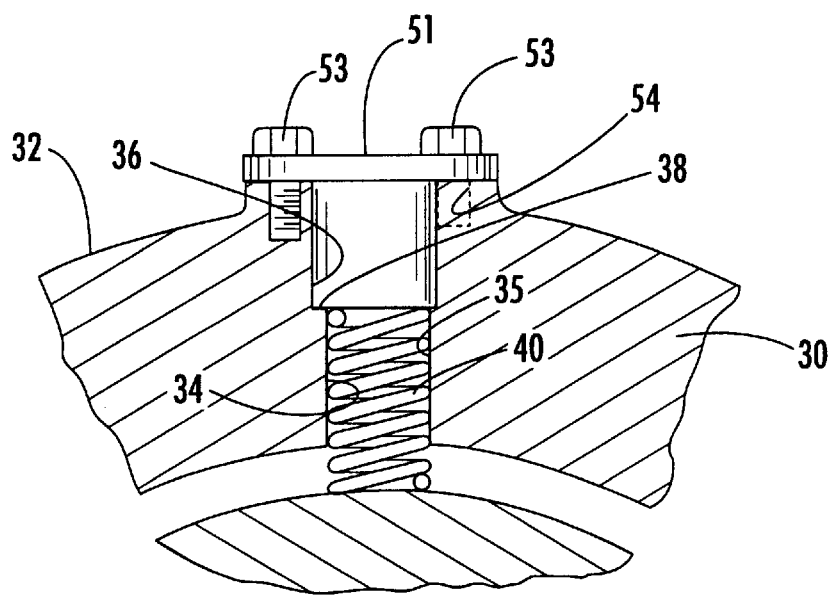
FIG. 9 is a detail of a view similar to that shown in FIG. 4 and showing alternative embodiments of the setting plugs shown in FIGS. 10 and 11 for securing the springs in the collar member component of the shaft blocking apparatus of the invention.
Figure 10:
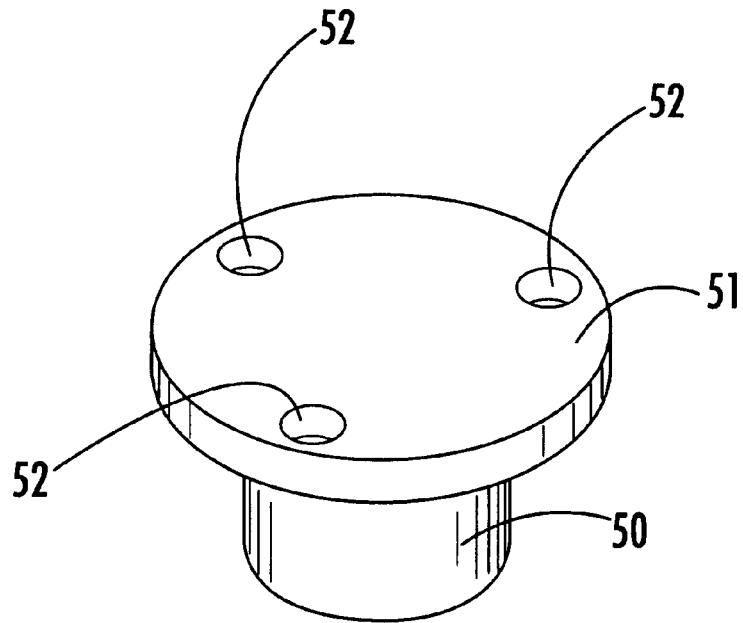
FIG. 10 is an elevated perspective view of an alternative embodiment of the setting plug for securing the springs in the collar member component of the shaft blocking apparatus of the invention.
Figure 11:
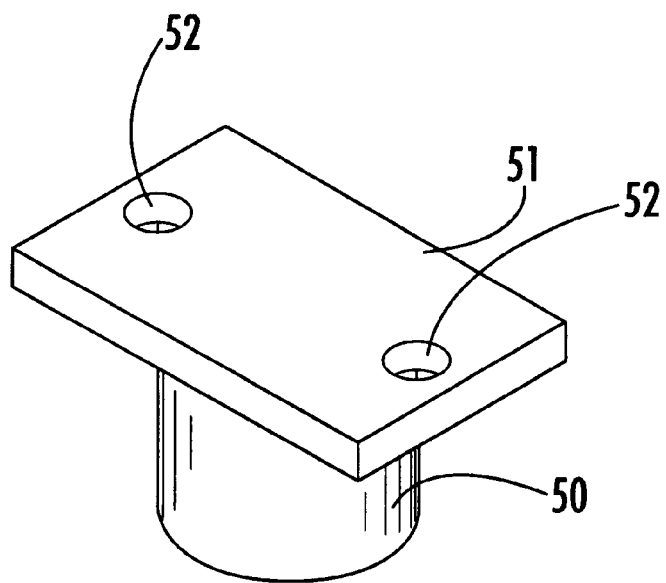
FIG. 11 is an elevated perspective view of another alternative embodiment of the setting plug for securing the springs in the collar member component of the shaft blocking apparatus of the invention.

In the embodiment shown in FIG. 9, upper portion 36 is not threaded and is configured to receive a setting plug in the form of an unthreaded, capped plug 50 such as shown in FIGS. 10 and 11.

As shown in FIGS. 5 and 9, upper portion 36 of each radial opening 34 is disposed concentrically relative to lower portion 35 and defines an annular shoulder 38 where lower portion 35 joins upper portion 36. In effect, annular shoulder 38 defines a counter bore. As shown in FIG. 5, each shoulder 38 is configured to be disposed at a predetermined radial distance, which is indicated by the letter "R", from the rotational axis of the shaft to be blocked. For the shaft cap 22 for a nominal 8.5 inch diameter shaft at the non-drive end 16, the distance "R" would be on the order of 5.75 inches. The rotational axis of the shaft to be blocked is indicated generally in FIG. 5 by the point of intersection designated by the numeral 13, which is coincident with the intersection of the central radial axes, which are indicated by the dashed lines designated by the numeral 39 in FIGS. 3 and 5, formed through each of the plurality of radial openings 34 defined in collar member 30.

As shown in FIGS. 3 and 5 for example, collar member 30 is configured with a plurality of symmetrically arranged installation holes 33 so that collar member 30 can be secured to the housing 11 of the shaft 14 to be blocked. Installation holes 33 extend generally axially through collar member 30. As shown in FIGS. 3 and 4 for example, an installation bolt 37 is received through each installation hole 33. As shown in FIG. 2 for example, each installation bolt 37 is threaded into housing 11 to secure collar member 30 to housing 11.

In further accordance with the present invention, a component capable of supplying a predetermined force is provided. As shown in FIGS. 2–4 and 6 for example, a plurality of resilient, axially extending spring members 40 are configured to be received for radial movement within each of the radial openings 34 of collar member 30. As shown in FIGS. 2, 4 and 6 for example, each spring member 40 is disposed in one of radial openings 34 configured in collar member 30. As shown in FIG. 3 for example, each spring member 40 has a front end 41 and a back end 42 opposite front end 41. As is conventional with helical, wire spring members, each spring member 40 is characterized by a predetermined force constant that enables prediction of the force applied per unit of length of compression of each spring member 40. Each spring member 40 is sized in relation to the relative dimensions of collar member 30 and shaft cap 22 (if present) and relative to the radial distance "R" between shoulder 38 of collar member 30 and the rotational axis 13 of the shaft 14 to be blocked. In this way, a predetermined force can be applied by each spring member 40 to outer surface 23 of shaft cap 22 and thereby apply a predetermined load to the roller bearing 18 supporting the non-drive end 16 of the shaft 14 to be blocked. The plurality of spring members 40 serve to provide a means for applying a downward load and a sideways load on roller bearing 18 to prevent roller bearing 18 and rollers 18A thereof, from undergoing potentially damaging radial movements during shipment of the machine 10. A typical heavy duty spring member 40 would have an axial length of about two (2) inches, a diameter of about three-quarters (0.75) inches and require about 319 pounds of force to deflect one tenth (0.10) of an inch.

In further accordance with the invention, a setting plug is provided to set the force to be applied by each spring member. In one embodiment of the present invention, a spacer is provided. As shown in FIG. 3, each spacer is configured in the form of a circular disk member 44 that has a front surface 45 and a back surface 46 disposed opposite front surface 45. Central region 43 covers the same area as is exposed to inner portion 35 of radial opening 34. As shown in FIGS. 2, 4 and 6, each disk member 44 is disposed within a radial opening 34 and rests on top of back end 42 of spring member 40. Each front surface 45 of disk member 44 has a central region 43 configured to engage back end 42 of spring member 40. Thus, each disk member 44 can compress spring member 40 until disk member 44 rests against shoulder 38 of each radial opening 34 in collar member 30. The axial length of a typical disk member 44 would be about one-quarter (0.25) inches.

As shown in FIGS. 2, 3, 4 and 6, a plurality of threaded setting bolts 48 are provided to be used to secure disk members 44 in radial openings 34. Each setting bolt 48 is threadingly received in an upper threaded portion 36 of one of radial openings 34 of collar member 30. Each setting bolt 48 is screwed into a threaded upper portion of radial opening. Thus, each setting bolt 48 is screwed into collar member 30 so as to butt against back surface 46 of each disk member 44 inserted in the radial opening 34. However, the forward end of each setting bolt 48 is machined smooth so as to remove any threads that otherwise might result in galling as each bolt is torqued. Each setting bolt 48 is tightened until the forward end 49 (FIG. 3) of the setting bolt forces front surface 45 of disk member 44 to rest against shoulder 38, which prevents the installer from tightening the bolt 48 in a manner that would result in any asymmetry in the application of the forces applied by each of the spring members 40. As shown in FIGS. 2, 4 and 6, collar member 30 becomes secured to machine housing 11 and holds spring members 40 so as to apply a predetermined force against outer circumferential surface 23 of shaft cap 22 (or surface 28 of shaft 14, FIG. 7) wherein roller bearing 18 is subjected to a predetermined radial load.

In an alternative embodiment shown in FIG. 9, spacer 44 and setting bolts 48 are replaced by a capped plug 50 having an integral cap plate 51. Capped plug 50 is configured to be received in an unthreaded upper portion 36 of radial opening 34 with the forward end of capped plug 50 resting against shoulder 38, in a fashion similar to that described above for spacer 44. As shown in FIG. 10, capped plug 50 can be provided with a circular cap plate 51 in which three symmetrically disposed attachment holes 52 are formed. As shown in FIG. 9, an attachment screw 53 is configured to pass through each attachment hole 52 and thread into a receiving hole 54 formed in collar member 30 to secure cap plate 51 to upper surface 32 of collar member 30. Similarly, as shown in FIG. 11, capped plug 50 can be provided with a rectangular cap plate 51 in which two symmetrically disposed attachment holes 52 are formed.

The following method uses one embodiment of the present invention to prepare the large scale machine 10 with a single shaft extension for shipment. Conventional means, such as shown in FIG. 1, are used initially to block the machine's rotatable shaft 14 against axial movement and circumferential movement, i.e. rotation of shaft 14. The apparatus of the present invention is installed on the non-drive end 16 of the shaft to be blocked, after the conventional brace has been installed to lock the shaft against axial and circumferential movement. As shown in FIGS. 2 and 6 for example, shaft cap 22 is secured to the non-drive end 16 of the shaft 14 in a manner such that the shaft cap's pilot member 21 is disposed into the counterbore 16A in the non-drive end 16 of single extension shaft 14 to be blocked, which ensures that the axis of rotational symmetry 24 is coincident with the rotational axis 13 of shaft 14. A plurality of threaded installation bolts 26 are used to attach shaft cap 22 to the non-drive end 16 of the shaft 14 as shown in FIG. 6 for example.

Then, collar member 30 is secured by installation bolts 37 to housing 11 in the vicinity of the non-drive end 16 of the shaft 14. Collar member 30 is secured so that the rotational axis 13 of the shaft 14 coincides with the point of intersection of the radially directed axial centerlines 39 of each of the radial openings 34 formed in collar member 30. In this way, the radial distance "R" between this point of intersection 13 and the shoulder 38 of each radial opening 34 is a constant predetermined distance. A spring member 40 is inserted into each radial opening 34. Each spring member 40 is of identical length and force constant. The length and force constant are determined based on the amount of pre-loading to be applied to the roller bearing 18 supporting the non-drive end of the shaft in the machine. This will depend on such factors as the dimensions of the shaft 14, shaft cap 22, and collar member 30, as well as the performance characteristics of the roller bearing 18, and the weight of the rotatable assembly 12 of the machine 10.

Figure 7:
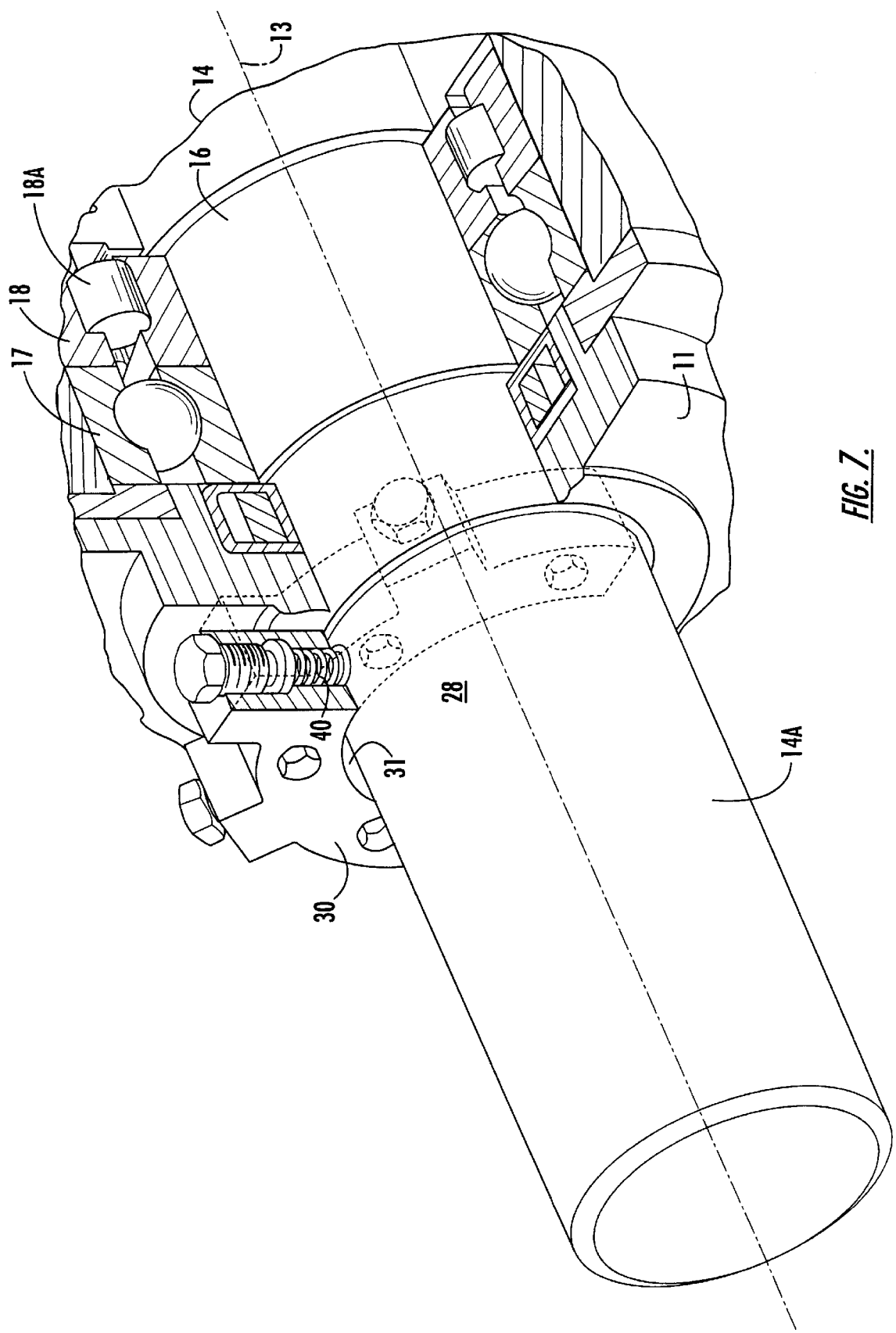
FIG. 7 is an elevated perspective view of a presently preferred double shaft extension embodiment of the shaft blocking apparatus of the invention installed on a machine, the view depicting portions cut away, portions shown in phantom, and portions shown in cross-section.

The springs are secured in the collar member in one of several ways. In the embodiment shown in FIGS. 3 and 4 for example, a disk member 44 is inserted into each radial opening 34 on top of each spring member 40. Then a threaded setting bolt 48 is threaded into each radial opening 34 and torqued until each disk member 44 is stopped against each shoulder 38 defined in each radial opening 34. As shown in FIG. 4, the result is that each of the plurality of springs 40 applies a predetermined force against outer circumferential surface 23 of shaft cap 22. (However, in the double shaft extension embodiment shown in FIG. 7, the result would be that each of the plurality of springs 40 applies a predetermined force against outer circumferential surface 28 of non-drive end 16 of shaft 14.) As shown in FIGS. 2, 6 and 7, both situations result in a predetermined radial load being applied to roller bearing 18 at non-drive end 16 of the shaft 14 to be blocked. This preloading of roller bearing 18 prevents unwanted radial movement of the shaft 14 and unwanted radial movement of the rollers 18A of roller bearing 18 during shipping wherein such radial movement could damage roller bearing 18 and rollers 18A and require same to be replaced before the machine 10 could be put into service.

It can be seen that the present invention provides a novel blocking apparatus and method for the rotatable assemblies of large scale machines. While preferred embodiments of the invention have been shown and described, modifications and variations may be made thereto by those of ordinary skill in the art without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

For example, as indicated by the chain-dashed line in FIG. 4, an alternative embodiment of collar member 30 can be configured in the form of a ring rather than the semi-circular portion of a ring depicted in FIGS. 3 and 5. In the full ring embodiment, additional radial openings 34 could be configured so as to form a symmetrical pattern of same. However, with collar member 30 disposed around the upward facing circumferential outer surface 23 of shaft cap 22 as shown in FIGS. 2 and 6, the forces applied by springs 40 contain force components oriented generally in the same direction as the force applied by gravity to the shaft 14 to be blocked, and this is sufficient to apply the predetermined "downward" pre-loading on the roller bearing 18 supporting the non-drive end 16 of the shaft 14 to be blocked.

What is claimed is:

1. A method for blocking the large scale, rotatable, cylindrical shaft housed in a large machine, the shaft having an axis of rotation, a drive end and a non-drive end disposed opposite the drive end, the non-drive end of the shaft being carried by a ball bearing and a roller bearing, the method comprising:

securing to the non-drive end of the shaft, a shaft cap having a curved outer circumferential surface configured concentrically relative to the axis of rotation of the shaft;

securing a plurality of spring members so as to apply a predetermined force in a direction that is substantially radially inward against said outer circumferential surface of said shaft cap wherein the roller bearing is subjected to a predetermined radial load; and wherein said step of securing said spring members includes:

securing to the housing at the non-drive end of the shaft, a curved collar member having an inner surface configured to be concentric with and surround at least a portion of said outer circumferential surface of said shaft cap, said collar member being provided with a plurality of radial openings, each said radial opening extending radially through said inner surface of said collar member;

configuring each said radial opening with a counterbore shoulder;

inserting a spring member in each said radial opening;

inserting a disk member in each said radial opening on top of said spring member; and threading a bolt into each said radial opening and torquing said bolt until said disk member is stopped against said shoulder.

2. A method as in claim 1, wherein the location of said shoulder in each of said plurality of radial openings is located at the same radial distance from the rotational axis of the shaft to be blocked.

3. A method for blocking the large scale, rotatable, cylindrical shaft housed in a large machine, the shaft having an axis of rotation, a drive end and a non-drive end disposed opposite the drive end, the non-drive end of the shaft being carried by a ball bearing and a roller bearing, the method comprising:

securing to the non-drive end of the shaft, a shaft cap having a curved outer circumferential surface configured concentrically relative to the axis of rotation of the shaft;

securing a plurality of spring members so as to apply a predetermined force in a direction that is substantially radially inward against said outer circumferential surface of said shaft cap wherein the roller bearing is subjected to a predetermined radial load; and wherein said step of securing said spring members includes:

securing to the housing at the non-drive end of the shaft, a curved collar member having an inner surface configured to be concentric with and surround at least a portion of said outer circumferential surface of said shaft cap, said collar member being provided with a plurality of radial openings, each said radial opening extending radially through said inner surface of said collar member;

inserting a spring member in each said radial opening; and compressing each said spring member against said outer circumferential surface of said shaft cap such that said predetermined force will be applied.

4. A method as in claim 3, wherein each said spring member is compressed utilizing a setting plug inserted into a respective of said radial openings.

5. A method as in claim 4, wherein said setting plug comprises a threaded bolt.

6. A method as in claim 5, wherein a disk is positioned to interpose said spring and said threaded bolt.

7. A method as in claim 4, wherein said setting plug comprises an unthreaded plug.

8. A method as in claim 3, wherein said curved collar defines at least three of said radial openings for receipt of a respective spring.

9. A method as in claim 3, wherein said radial openings are configured to limit compression of said springs so that said predetermined force will be achieved.

* * * * *